(12) United States Patent
Kim et al.

(10) Patent No.: US 6,721,028 B2
(45) Date of Patent: Apr. 13, 2004

(54) APPARATUS FOR FRINGE FIELD SWITCHING LIQUID CRYSTAL DISPLAY

(75) Inventors: Hyang Yul Kim, Kyoungki-do (KR); Seung Hee Lee, Cheollabuk-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 0 days.

(21) Appl. No.: 10/308,955

(22) Filed: Dec. 3, 2002

(65) Prior Publication Data

US 2003/0117558 A1 Jun. 26, 2003

(30) Foreign Application Priority Data

Dec. 26, 2001 (KR) ..................................... 2001-0085063

(51) Int. Cl.$^7$ ............................................. G02F 1/1343
(52) U.S. Cl. .......................... 349/141; 349/46; 349/129; 259/59; 259/72
(58) Field of Search .......................... 349/46, 129, 141; 257/59, 72

(56) References Cited

U.S. PATENT DOCUMENTS

| | | | |
|---|---|---|---|
| 5,191,451 A | * | 3/1993 | Katayama et al. ............ 349/48 |
| 6,223,034 B1 | | 4/2001 | Yamashita |
| 6,233,034 B1 | * | 5/2001 | Lee et al. .................... 349/141 |
| 6,320,221 B1 | * | 11/2001 | Choi et al. ................... 257/330 |
| 6,525,798 B1 | * | 2/2003 | Yamakita et al. ........... 349/141 |

* cited by examiner

*Primary Examiner*—Robert Kim
*Assistant Examiner*—Michael H. Caley
(74) *Attorney, Agent, or Firm*—Ladas & Parry

(57) ABSTRACT

The present invention provides a Fringe Field Switching-Liquid Crystal Display comprising: an upper substrate and a lower substrate; a gate line and a data line for defining a unit pixel, a plurality of protrusion parts being respectively formed on an edge region of the gate line adjacent to a pixel electrode, each of protrusion parts of the gate line being positioned in a depression part formed between the protrusion parts of the pixel electrode; a counter electrode formed in the unit pixel; a common line for applying a common signal to the counter electrode; a pixel electrode forming an electric field with the counter electrode, a plurality of protrusion parts being formed on an edge region of the pixel electrode adjacent to the gate line, each of protrusion parts being positioned in a depression part formed between the protrusion parts of the gate line; and a liquid crystal filled between the upper substrate and the lower substrate.

7 Claims, 5 Drawing Sheets

APPARATUS FOR FRINGE FIELD SWITCHING LIQUID CRYSTAL DISPLAY

BACKGROUND OF THE INVENTION

1. Field of the Invention

The present invention relates to a fringe field switching liquid crystal display device and, more particularly, to a fringe field switching liquid crystal display device realizing a high contrast ratio by modifying structures of a gate electrode and a pixel electrode.

2. Description of the Prior Art

A Liquid Crystal Display (hereinafter, referred to as "LCD") has advantages of lightweight, thin thickness and low power consumption, thereby being advantageously applied to a terminal of several kinds of an information apparatus and a video apparatus instead of Cathode Ray Tube (hereinafter, referred to as "CRT"). Especially, a TFT-LCD having a thin film transistor (hereinafter, referred to as "TFT") can realize a display device having both a high quality and a large area of a screen by its improved response features and the large number of pixels.

Generally, the TFT-LCD has a disadvantage of having a narrow viewing angle by employing Twisted Nematic (TN) mode. Recently, there has been provided an In Plane Switching (hereinafter, referred to as "IPS") to solve disadvantages of the narrow viewing angle of the TFT-LCD.

The IPS mode of LCD has realized a wide viewing angle, however, it still has disadvantages of a low aperture ratio and a low transmittance ratio due to the fact that a counter electrode and a pixel electrode are made of an opaque metal.

To overcome these disadvantages of the low aperture ratio and the low transmittance ratio of the IPS mode of LCD, there has been provided a Fringe Field Switching (hereinafter, referred to as "FFS") mode LCD.

The FFS mode of LCD has an advantage in which a counter electrode and a pixel electrode are made of a transparent metal to thereby improve the aperture ratio and the transmittance ratio.

And, the FFS mode of LCD has another advantage in which there is no light distortion due to anisotropy of the liquid crystal since a horizontal electric field and a parabolic electric field are employed therein, and in which a wide viewing angle is accomplished since the light is transmitted through the horizontally-arranged liquid crystal.

FIG. 1 is a top plan view of conventional FFS-LCD.

Referring to FIG. 1, the FFS-LCD shows a structure in which the pixel electrodes 50 are arranged in a slit mode being symmetric with respect to a common line 30. The FFS-LCD compensates a refractive rate of the liquid crystal, thereby accomplishing an ultra wide viewing angle of a high brightness resulting in a high quality of screen.

The pixel electrode 50 forms a fringe field and a counter electrode 40 arranged in a unit pixel defined by a gate line 10 and a data line 20 on a lower substrate 8 to activate the liquid crystal 70, thereby forming a predetermined image of the FFS-LCD. Although not shown, it is noted that a rubbing direction is horizontal, a polarizing axis of an upper polarizing plate (hereinafter, referred to as "analyzer") is in a vertical direction and that of a lower polarizing plate (hereinafter, referred to as "polarizer") is in a horizontal direction. A black matrix 60 is additionally formed on an upper substrate to prevent light leakage.

However, the conventional FFS-LCD has several disadvantages as described in the following.

First, referring to FIG. 1, a strong electric field is formed on a region A between the gate line and the pixel electrode. For example, in L0 gray (that is, a black screen), −8V of electric voltage is applied to the gate line and +5V of direct current electric voltage is applied to the pixel electrode.

As a result, 13V of strong direct current electric voltage is formed between the two electrodes.

FIG. 2 is an enlarged view of illustrating a region A of FIG. 1.

As shown in FIG. 2, the strong electric field (γ1) is formed in a vertical direction, thereby twisting the liquid crystal 70 on the region A between the gate line 10 and the pixel electrode 50 at a predetermined angle with respect to polarizing axis (α1) (β1) of the polarizing plates and in a state of L0 gray (black screen).

Therefore, there has been a disadvantage in which the light leakage is caused by molecules of the liquid crystal spaced apart from the polarizing axis.

Also, there have been other disadvantages in which the aperture ratio is lowered thereby resulting in the low brightness since the black matrix 60 is extended on the upper substrate 9 in order to prevent the light leakage from being generated in the black screen, and in which, to the contrary, if the black matrix is narrowed to improve the aperture ratio, the light leakage is not completely prevented to thereby lower a contrast ratio.

And also, there has been disadvantage in which a large amount of light leakage causes the light leakage to generated in the L0 gray (black screen) when the molecules of the liquid crystal are spaced apart in the black matrix for cutting off the light, in case of a color filter having 3.5 of a low Optical Density (OD) in a scheme employing the resin black matrix.

SUMMARY OF THE INVENTION

Accordingly, an object of the present invention is to provide a Fringe Field Switching Liquid Crystal Display having a high contrast ratio thereby improving a high quality of screen, by modifying a structure of a gate line and a pixel electrode in order to correspond the rubbing direction to the direction of the electric field.

In order to achieve the above object, there is provided a FFS-LCD comprising: an upper substrate and a lower substrate; a gate line and a data line for defining a unit pixel, a plurality of protrusion parts being respectively formed on an edge region of the gate line adjacent to a pixel electrode, each of protrusion parts of the gate line being positioned in a depression part formed between the protrusion parts of the pixel electrode; a counter electrode formed in the unit pixel; a common line for applying a common signal to the counter electrode; a pixel electrode forming an electric field with the counter electrode, a plurality of protrusion parts being formed on an edge region of the pixel electrode adjacent to the gate line, each of protrusion parts being positioned in a depression part formed between the protrusion parts of the gate line; and a liquid crystal filled between the upper substrate and the lower substrate.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
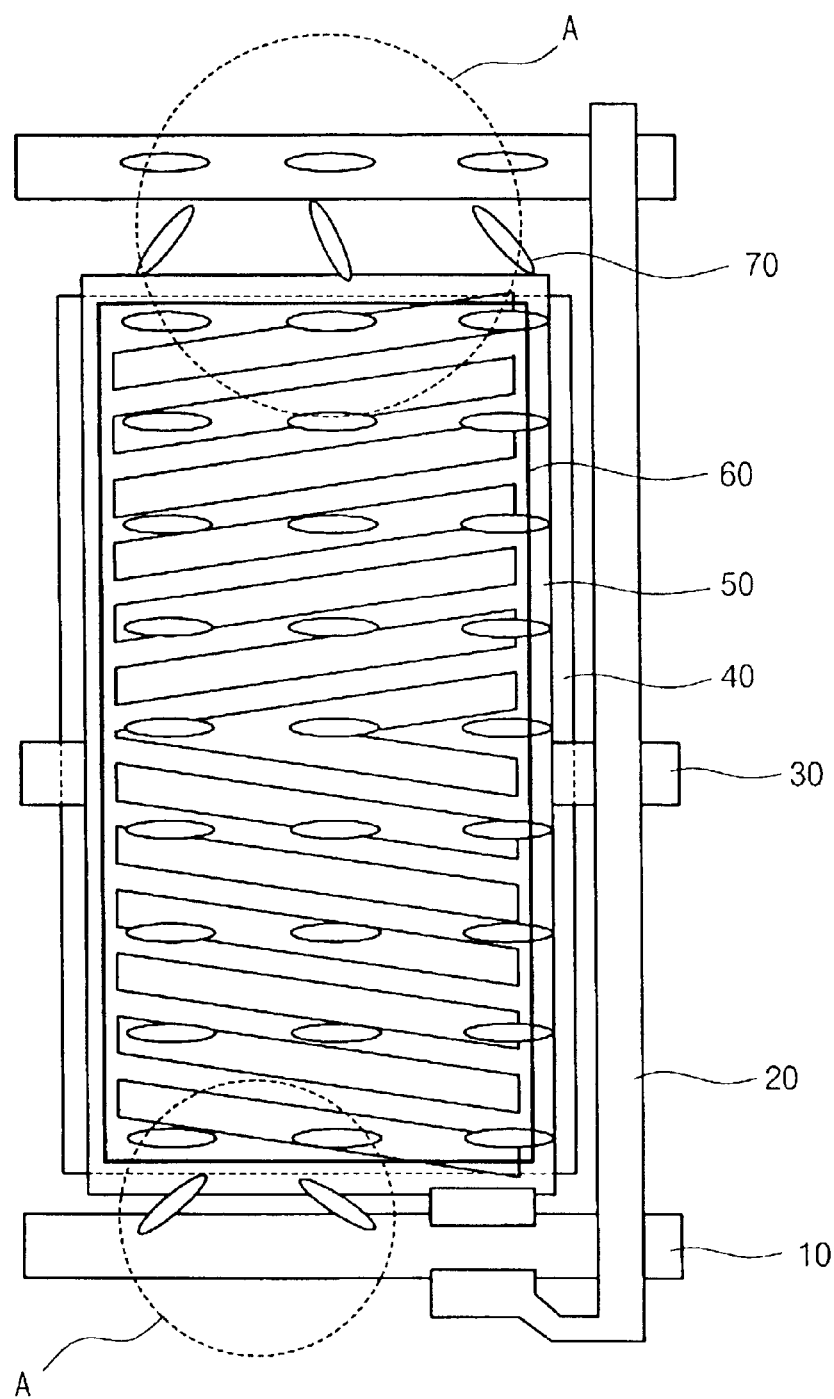
FIG. 1 is a top plan view of illustrating a conventional FFS-LCD.
Figure 2:
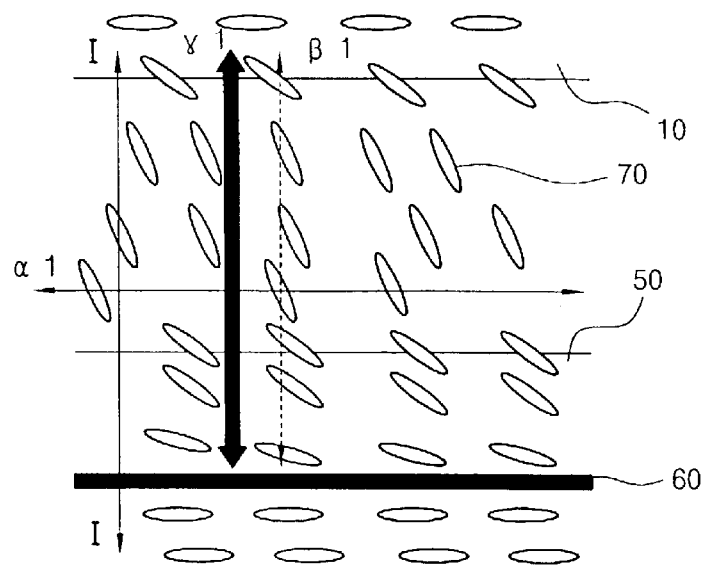
FIG. 2 is an enlarged view of illustrating a region A of FIG. 1.
Figure 3:
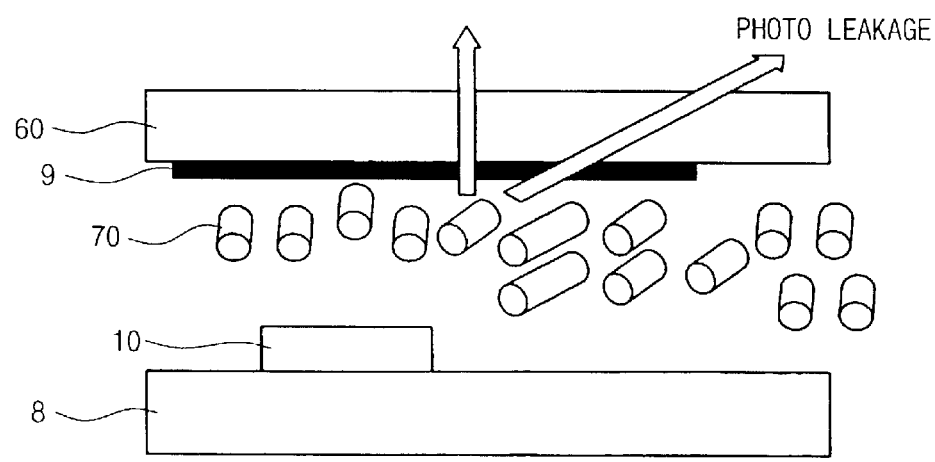
FIG. 3 is a cross sectional view taken along the line I—I of FIG. 2.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 4A:
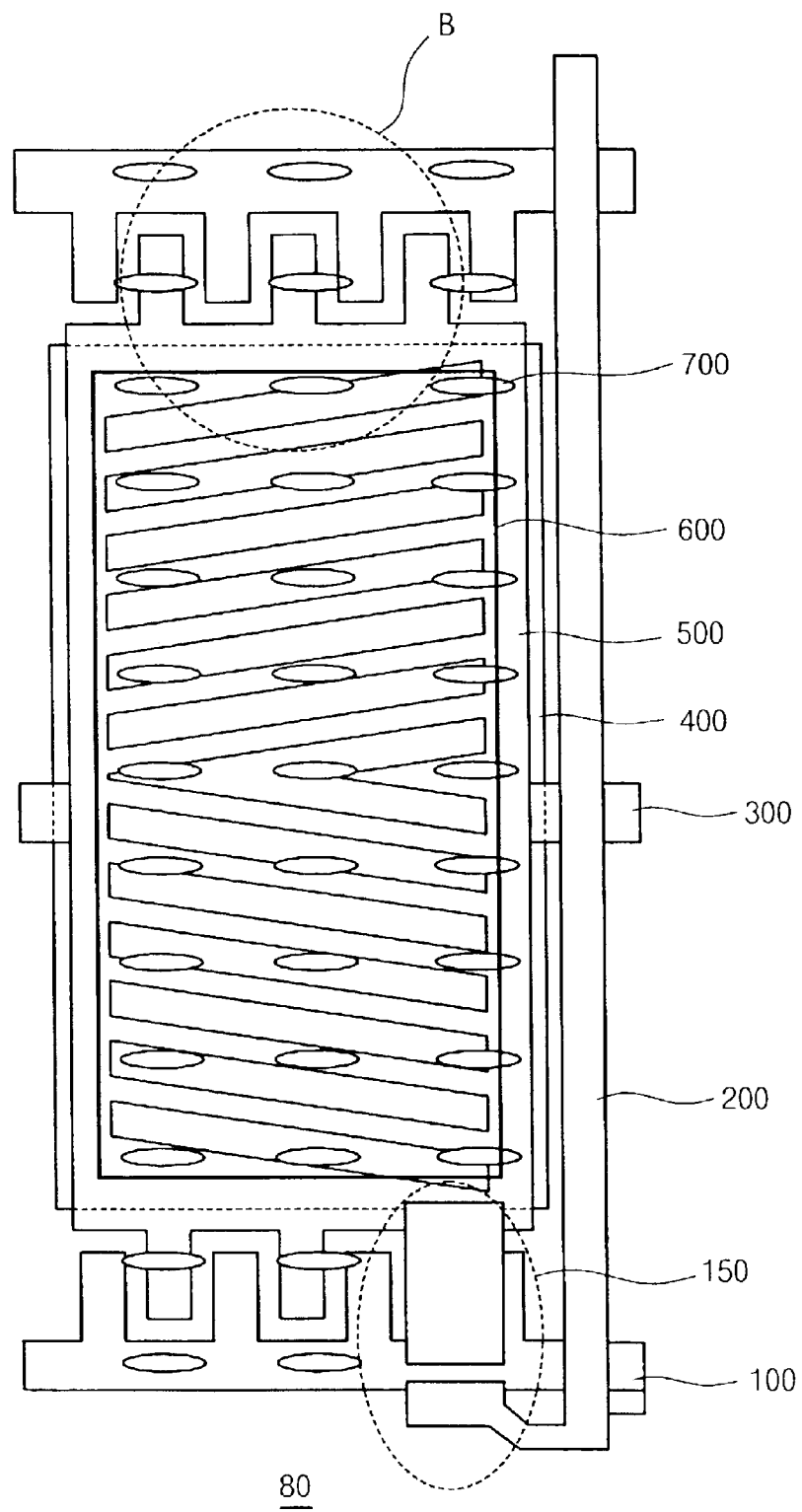
FIG. 4A is a top plan view of illustrating FFS-LCD according to the present invention.
Figure 4B:
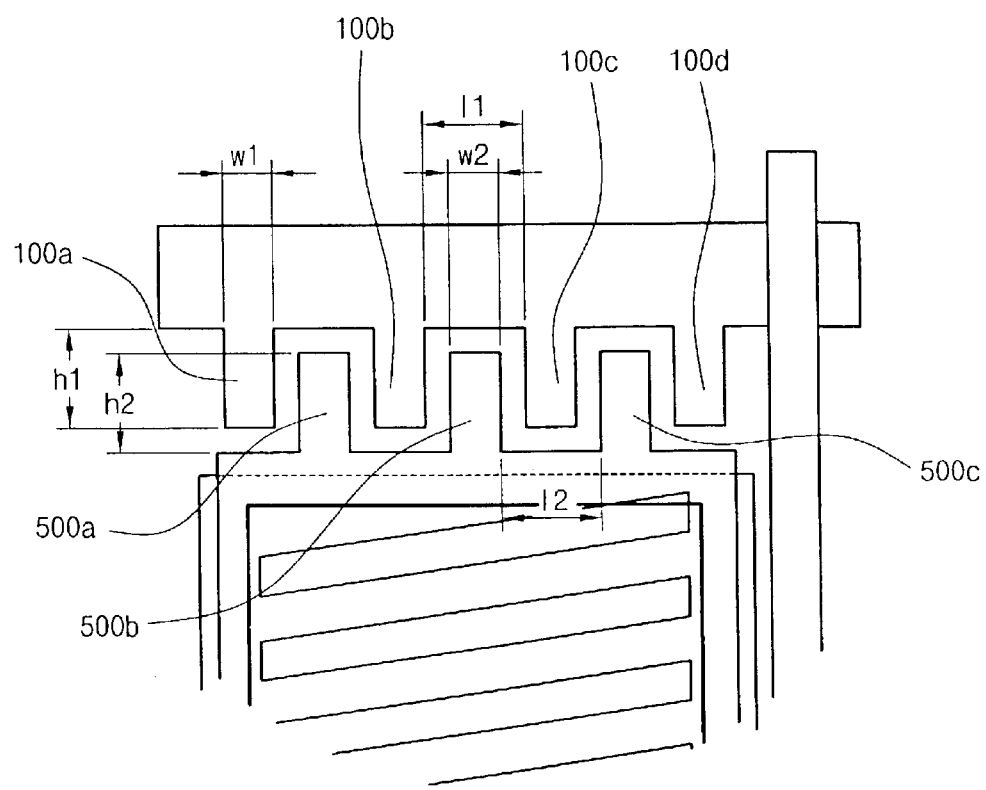
FIGS. 4B and 5 are enlarged views of illustrating a region B of FIG. 4A.
Figure 5:
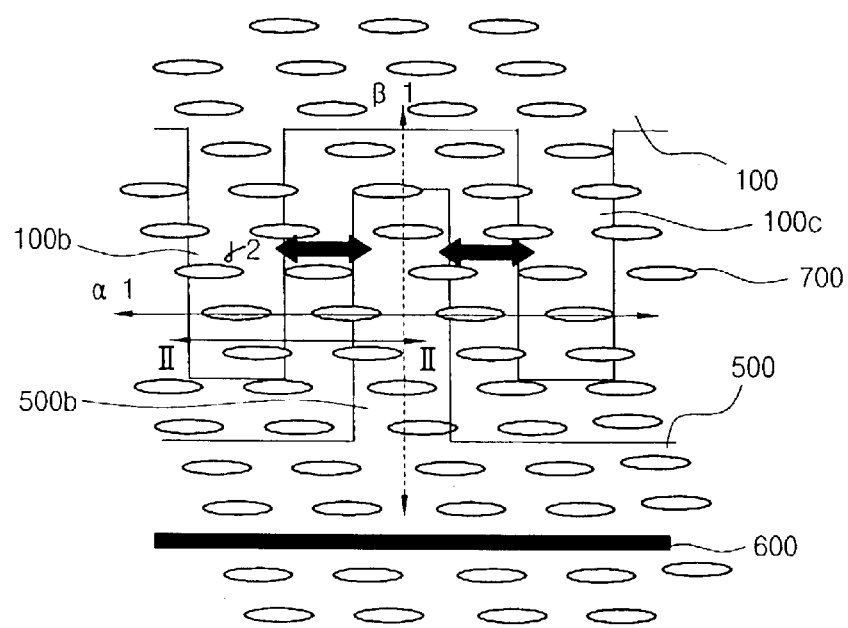
Figure 6:
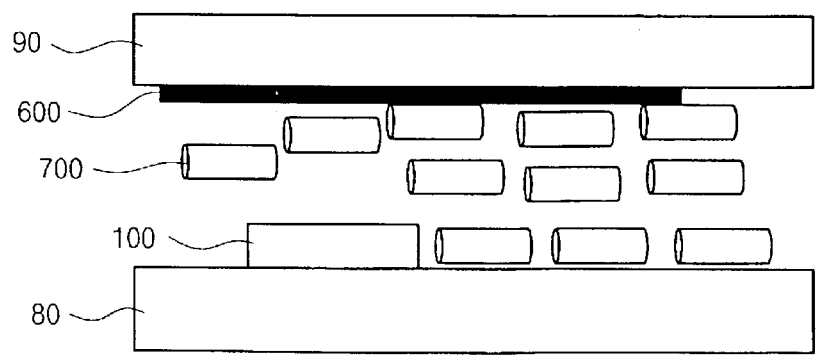
FIG. 6 is a cross sectional view taken along the line II—II of FIG. 5.

FIG. 4A is a top plan view of illustrating the FFS-LCD according to the present invention. FIGS. 4B and 5 are enlarged views of illustrating a region B of FIG. 4A, and FIG. 6 is a cross sectional view taken along the line II—II of FIG. 5.

Referring to FIG. 4A, the FFS-LCD according to the present invention has a structure in which a gate line 100 is extended in a horizontal direction and a data line 200 is extended in a vertical direction in order to perpendicularly arrange the gate line 100 and a data line 200 each other on a substrate 80 such as a transparent insulating substrate made of glass.

A Thin Film Transistor(TFT) 150 is arranged at the intersection of the gate line 100 and the data line 200 as a switching element.

A counter electrode 400 is formed in a unit pixel defined by the gate line 100 and the data line 200, and a common line 300 is formed parallel with respect to the gate line 100 to divide the unit pixel into a upper unit pixel and a lower unit pixel. The common line 300 is in contact with the counter electrode 400 to perform a function of applying a common signal to the counter electrode 400.

A pixel electrode 500 for forming a fringe field such as the counter electrode 400 is formed on the common line 300, and a liquid crystal 700 has a positive dielectricity in which the arrangement of the liquid crystal depends on the electric field formed by the counter electrode 400 and the pixel electrode 500. The liquid crystal 700 is formed between a lower substrate 80 and an upper substrate(not shown).

Although not shown in FIG. 4A, it is noted that the rubbing direction and the polarizer direction are horizontal and the analyzer direction is vertical. And, a black matrix 600 is formed on the substrate 80, that is, on the upper substrate (not shown) opposite to the lower substrate 80 in order to prevent the light leakage from being generated in the liquid crystal 700.

The pixel electrode 500 is patterned to form a plurality of slanting slits therein. The patterns of the slanting slits are symmetrical with respect to the common line 300 in a long rectangular direction of the pixel electrode 500 and at an angle of less than ±45° with the gate line 100.

That is, the pixel electrode 500 has a clamp shape of "<", thereby advantageously applied to the manner rubbed parallel with the gate line 100.

Referring to FIG. 4B, there are provided a plurality of protrusion parts 500a, 500b and 500c on the edge of the pixel electrode 500 adjacent to the gate line 100.

Also, there are provided a plurality of protrusion parts 100a, 100b, 100c and 100d on the edge of the gate line 100 adjacent to the pixel electrode 500.

The protrusion parts of the pixel electrode 500a, 500b and 500c are arranged on depression parts between the protrusion parts of the gate line 100a, 100b, 100c and 10d.

In other words, the left first protrusion part 500a of the pixel electrode is arranged on the depression part between the left first protrusion part 100a and the left second protrusion part 100b of the gate line.

Similarly, the left second protrusion part 500b of the pixel electrode is arranged on the depression part between the left second protrusion part 100b and the left third protrusion part 100c of the gate line. And, the left third protrusion part 500c of the pixel electrode is arranged on the depression part between the left third protrusion part 100c and the left fourth protrusion part 100d.

As a result, the protrusion parts 100a, 100b, 100c and 100d are also arranged on the depression parts between the protrusion parts 500a, 500b and 500c of the pixel electrode.

It is desirable that the protrusion parts 100a, 100b, 100c and 100d of the gate line and the protrusion parts 500a, 500b and 500c of the pixel electrode have a shape, for example, a rectangular shape not interrupting the electric field parallel to the rubbing direction (horizontal direction).

And, it is desirable that the rectangular shaped protrusion parts 100a, 100b, 100c and 100d of the gate line have a width w2 of less than 5 μm (especially desirably 4 μm), a height h1 of 5 to 20 μm, and the gap 11 of depression parts of 12 μm.

Similarly, it is desirable that the rectangular shaped protrusion parts 500a, 500b and 500c of the pixel electrode have a width w2 of less than 5 μm (especially desirably 4 μm), a height h2 of 5 to 20 μm, and the gap 12 of the depression parts of 12 μm.

In the above-mentioned structure, when an electric field is not applied, that is, in a state of L0 gray (black screen), the liquid crystals 700 are arranged corresponding to an initial rubbing direction (horizontal direction) both on the center region and the edge region B of the pixel electrode 500.

Referring to FIG. 5, the liquid crystals are arranged corresponding to the initial rubbing direction on the edge region B since the direction of strong electric field (γ2) between the protrusion parts 100b, 100c of the gate line and the protrusion parts 500b of the pixel electrode corresponds to the initial rubbing direction (horizontal direction).

Referring to FIG. 6, if a resin black matrix 600 is employed on the upper substrate 90 of a color filter having a low OD of less than 4.5, light leakage is minimized since the liquid crystals 700 are arranged corresponding to the direction of polarizing axis in the black matrix region. As a result, the light leakage is prevented in the black screen.

As described above, the present invention can eliminate the light leakage by modifying structures of the pixel electrode and the gate line so that the rubbing direction of the liquid crystal corresponds to that of the electric field. Therefore, it is possible to accomplish a high contrast ratio and improve a screen quality.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A Fringe Field Switching Liquid Crystal Display comprising:

an upper substrate and a lower substrate;

a gate line and a data line for defining a unit pixel, a plurality of protrusion parts being respectively formed on an edge region of the gate line adjacent to a pixel electrode, each of protrusion parts of the gate line being positioned in a depression part formed between a plurality of protrusion parts of the pixel electrode;

a counter electrode formed in the unit pixel;

a common line for applying a common signal to the counter electrode;

the pixel electrode forming an electric field with the counter electrode, the plurality of protrusion parts being formed on an edge region of the pixel electrode adjacent to the gate line, each of the protrusion parts being positioned in a depression part formed between the protrusion parts of the gate line; and a liquid crystal filled between the upper substrate and the lower substrate.

2. The FFS-LCD as set forth in claim 1, wherein the protrusion part of the pixel electrode has a rectangular shape.

3. The FFS-LCD as set forth in claim 1, wherein the protrusion part of the gate line has a rectangular shape.

4. The FFS-LCD as set forth in claim 2 or 3, wherein the protrusion part has a width of less than 5 $\mu$m and a height of 5 to 20 $\mu$m, and the distance of two depression parts between the protrusion parts is 12 $\mu$m.

5. The FFS-LCD as set forth in claim 4, wherein the protrusion part has a width of 4 $\mu$m.

6. The FFS-LCD as set forth in claim 1, wherein an alignment layer is formed on one or more of the upper and the lower substrates, and the rubbing direction of the alignment layer is 0° with respect to the gate line.

7. The FFS-LCD as set forth in claim 1, wherein a resin black matrix color filter having Optical Density of less than 4.5 is formed on the upper substrate.

* * * * *